Sept. 15, 1931. A. Y. DODGE ET AL 1,822,988
BRAKE
Filed Nov. 29, 1927
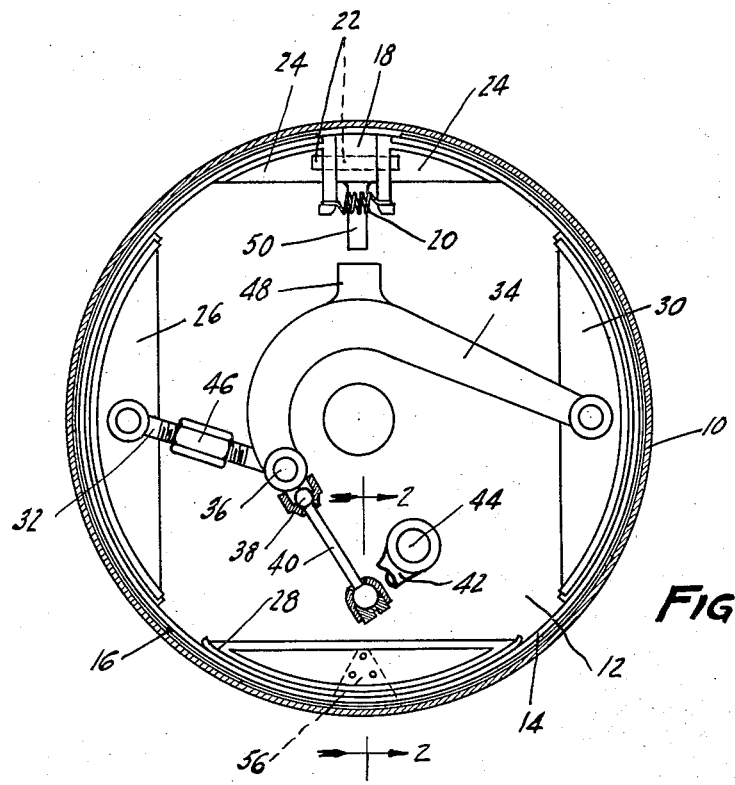
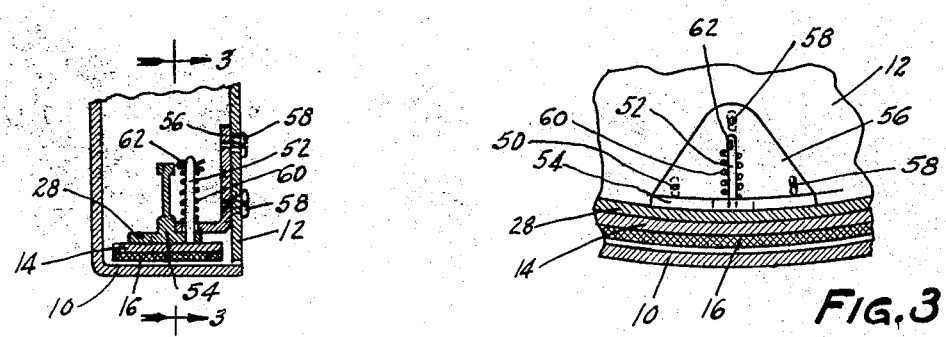
INVENTOR
ADIEL Y. DODGE
WILLARD L. POLLARD
BY
M. W. McConkey
ATTORNEY Patented Sept. 15, 1931

1,822,988

UNITED STATES PATENT OFFICE

ADIEL Y. DODGE, OF SOUTH BEND, INDIANA, AND WILLARD L. POLLARD, OF CHICAGO, ILLINOIS, ASSIGNORS TO BENDIX BRAKE COMPANY, OF SOUTH BEND, INDIANA, A CORPORATION OF ILLINOIS

BRAKE

Application filed November 29, 1927. Serial No. 236,501.

This invention relates to brakes, and is illustrated as embodied in an internal expanding brake for an automobile.

One object of the invention is to provide a powerful but simple brake which is fully controllable, preferably by using as the friction means of the brake a band or ring which is cut through at one point to provide separable ends, and which is rendered more controllable than the usual expansible friction band by reinforcing it in such a manner as to render it substantially rigid in one or more segments, each not more than 180° in length.

In the drawings we show three such rigid segments arranged end to end, the reinforcements being provided by tapered parts or shoes, of T-section, secured to the back of the band.

The above-described arrangement gives the controllability of a shoe brake with the simplicity and powerful "servo" action of an expanding band brake. This is especially desirable in a brake of the type in which the friction means anchors at one end when the drum turns in one direction and at the other end when the drum is turning in the other direction, thus giving full self-energization or "servo" action both forward and in reverse. To this end, in the illustrated brake the braking torque is taken by a fixed abutment or anchor arranged between the separable ends of the band.

As the applying means of the brake, we prefer to utilize a toggle, which may be pivoted directly to the rigid segment or segments of the friction means. A suitable adjustment for the applying means may be provided.

While certain very important features of novelty relate primarily to the use of a reinforced continuous band, it will be noted that other features are applicable to friction means of other types in which there is a series of rigid segmental parts arranged end to end and engageable with the same zone of the brake drum. All these various features, together with certain novel and desirable structural details of a patentable nature, will be apparent from the following description of one illustrative embodiment shown in the accompanying drawings, in which:

Figure 1 is a vertical section through the brake, just inside the head of the brake drum, showing the friction means of the brake in side elevation;

Figure 2 is a partial radial section on the line 2—2 of Figure 1, showing a guide for the center of the friction means; and Figure 3 is a section on the line 3—3 of Figure 2, showing the guide in elevation.

The illustrated brake includes the usual rotatable drum 10, at the open side of which is a stationary support such as a backing plate 12. Within the drum is arranged the novel friction means of the brake, shown as a continuous expansible band or ring 14 carrying friction brake lining 16, and cut through at one point to provide separable ends on opposite sides of a fixed abutment or anchor 18. A spring 20 urges these ends against the abutment 18, which abutment may be secured to the backing plate 12. Abutment 18 may, if desired, be provided with a pin or guide 22 extending along a chord of the drum through openings in novel thrust fittings 24 which are welded or otherwise secured to the ends of the band 14, and which directly engage the abutment 18. Guide 22 is shown as a separate pin carried by abutment 18 and loosely extending through openings in the ends of fittings 24. This construction is not claimed in the present joint application, as it is the sole invention of Adiel Y. Dodge.

According to an important feature of the invention, band 14 is reinforced to form one or more substantially rigid segments, each having an effective friction portion not more than 180° in length because a rigid segment having an effective length of more than 180° cannot be moved away from the drum to a released position. Preferably there are three such segments, each less than 120° in length, and which are arranged end to end to engage the same zone of the drum 10. This leaves the band 14 fully expansible, yet gives the controllability of a set of rigid shoes. In the drawings, the band is shown provided with three tapered rigid arcuate shoes, or equivalent parts, 26 and 28 and 30. These shoes may be welded or riveted or otherwise secured to the internal face of the band, the shoes preferably being T-shaped in cross-section.

The applying means of the brake is preferably arranged to shift with the band, so that it remains fully effective although one end of the band anchors on abutment 18 when the drum is turning clockwise and the other end anchors on the abutment 18 when the drum is turning counterclockwise. We prefer to use a toggle, comprising links 32 and 34, shown as pivotally connected to the shoes 26 and 30, respectively, and connected at the knuckle of the toggle by a pivot 36. Link 34 is extended to form a seat or socket for a ball 38 at the end of a link 40 connecting the toggle to an operating arm 42 on a shaft 44. The toggle may be adjusted by means such as a right-and-left threaded turnbuckle 46 forming part of one of the links 32, 34, or 40. Link 34 is shown with a projection 48 engaging a stop 50 extending downwardly from abutment 18, to prevent the possibility of locking the toggle.

Opposite the abutment 18, means may be provided for determining the released position of the band. The illustrated means includes a post 52 fixedly secured to one of the flanges of shoe 28, and extending through a slot in a flange 54 of a bracket 56. Bracket 56 is adjustably secured to the backing plate 12 by screws 58 extending through slots in the backing plate. A coil spring 60 sleeved on post 52, and confined between flange 54 and a cotter pin or other stop 62 at the end of post 52, urges shoe 28 radially inward against flange 54, which thus serves as a stop for band 14.

While one illustrative embodiment has been described in detail, it is not our intention to limit the scope of the invention to that particular embodiment, or otherwise than by the terms of the appended claims. The present application is filed as a continuation of part of the subject-matter of our prior application No. 702,765, filed March 29, 1924.

We claim:

1. A brake comprising, in combination, a drum, a fixed abutment at one side of the drum, a floating expansible band within the drum having said abutment between its ends and arranged to have one end anchor against said abutment when the drum is turning in one direction and to have the other end anchor against said abutment when the drum is turning in the other direction, and a toggle connected to said band on opposite sides of the abutment and arranged to expand the band to apply the brake, said band having means rendering a plurality of segments, each of not more than 180°, substantially rigid, to render the self-energizing action of the band more controllable, while still leaving the band as a whole substantially expansible.

2. A brake comprising, in combination, a drum, a fixed abutment at one side of the drum, a floating expansible band within the drum having said abutment between its ends and arranged to have one end anchor against said abutment when the drum is turning in one direction and to have the other end anchor against said abutment when the drum is turning in the other direction, and a toggle connected to said band on opposite sides of the abutment and arranged to expand the band to apply the brake, said band having means rendering at least one segment of not more than 180°, substantially rigid, to render the self-energizing action of the band more controllable, while still leaving the band as a whole substantially expansible, the rigid segment terminating substantially abruptly.

3. A brake comprising, in combination, a drum, a friction device within the drum comprising a floating ring cut through at one point to provide separable ends and reinforced in successive spaced segments to be substantially rigid while the ring as a whole is expansible, a fixed abutment arranged between said separable ends and arranged to take the braking torque from one or the other of said ends according to the direction of drum rotation, and means for expanding the ring to apply the brake.

4. A brake comprising, in combination, a drum, a friction device within the drum comprising a floating ring cut through at one point to provide separable ends and reinforced in successive spaced segments to be substantially rigid while the ring as a whole is expansible, a fixed abutment arranged between said separable ends and arranged to take the braking torque from one or the other of said ends according to the direction of drum rotation, and a brake-applying toggle connected to two of the rigid portions of said ring.

5. A friction device for a brake comprising an expansible ring cut through at one point to provide separable ends and adapted to anchor at either of said ends, and which is reinforced to be substantially rigid in at least three segments arranged end to end, the ring as a whole being expansible.

6. A brake comprising, in combination, a drum, friction means engageable with the drum and including at least three substantially rigid segments arranged end to end, at least two of which are connected, and an operating toggle acting directly on the end two of the said segments, the central segment being applied at least in part by at least one of the end segments.

7. A brake comprising, in combination, a drum, friction means engageable with the drum and including at least three substantially rigid and movably-connected segments arranged end to end, and applying means acting directly on the end two of the said segments, the central segment being applied at least in part by the two end segments.

8. An internal brake construction comprising a brake drum, a flexible continuous brake band bearing on the inner surface of said brake drum over more than 180 degrees thereof, abutments near the ends of said brake band for holding it against movement in either direction under the action of the brake drum, a pair of arcuate shoes engaging diametrically opposite portions of said brake band, and means for exerting radial pressure on said brake shoes.

9. An internal brake construction comprising a brake drum, a flexible continuous brake band bearing on the inner surface of said brake drum over more than 180 degrees thereof, abutments near the ends of said brake band for holding it against movement in either direction under the action of the brake drum, a pair of arcuate shoes engaging diametrically opposite portions of said brake band, and means for exerting radial pressure on said brake shoes, comprising a pair of links pivotally connected together and pivotally connected to said shoes respectively.

10. An internal brake construction comprising a brake drum, flexible brake band means bearing on the inner surface of said brake drum, abutment means for holding said brake band means against movement under the action of the brake drum, a pair of arcuate shoes engaging diametrically opposite portions of said brake band means, and means for exerting radial pressure on said shoes.

11. An internal brake construction comprising a brake drum, flexible brake band means bearing on the inner surface of said brake drum, abutment means for holding said brake band means against movement under the action of the brake drum, and means for exerting radial pressure on diametrically opposite portions of said brake band means including a toggle linkage pivoted to opposite sides of the band.

12. An internal brake construction, comprising a brake drum, flexible brake band means bearing on the inner surface of said brake drum, abutment means for holding said brake band means against movement under the action of the brake drum, a pair of arcuate shoes engaging different portions of said brake band means, and means for exerting radial pressure on said shoes.

13. A brake comprising, in combination, a drum, anchoring abutment means, and a shiftable and expansible friction device inside of the drum and including at least three connected rigid segments engageable with the same zone of the drum and so arranged that one part of said device anchors on said means when the drum is turning in one direction and another part anchors on said means when the drum is turning in the other direction.

14. Brake friction means comprising at least three substantially rigid connected segments arranged end to end, said means being expansible as a whole and extending through substantially an entire circumference, and said means having adjacent ends which are separable to apply the brake, in combination with anchoring abutment means adjacent said ends and against which either of said ends may anchor.

15. A brake comprising, in combination, a drum, friction means engageable with the inside of the drum and shiftable to anchor at one end when the drum is turning in one direction and at the other end when the drum is turning in the other direction, and an operating toggle for the friction means including pivotally-connected links, at least one of which is extensible for adjustment.

In testimony whereof, we have hereunto signed our names.
ADIEL Y. DODGE.
WILLARD L. POLLARD.